United States Patent [19]

Martin et al.

[11] Patent Number: 5,085,671

[45] Date of Patent: Feb. 4, 1992

[54] METHOD OF COATING ALUMINA PARTICLES WITH REFRACTORY MATERIAL, ABRASIVE PARTICLES MADE BY THE METHOD AND ABRASIVE PRODUCTS CONTAINING THE SAME

[75] Inventors: Lawrence L. Martin; Jonathan Storer; Michael W. Carpenter, all of St. Paul, Minn.

[73] Assignee: Minnesota Mining and Manufacturing Company, St. Paul, Minn.

[21] Appl. No.: 517,931

[22] Filed: May 2, 1990

[51] Int. Cl.⁵ .............................................. B24D 3/00
[52] U.S. Cl. ...................................... 51/293; 51/295; 51/307; 51/309
[58] Field of Search ................... 51/293, 295, 307, 309

[56] References Cited

U.S. PATENT DOCUMENTS

| | | | |
|---|---|---|---|
| 3,351,543 | 11/1967 | Vanderslice | 204/192 |
| 3,770,671 | 9/1988 | Monroe et al. | 51/293 |
| 3,836,451 | 9/1974 | Snaper | 204/298 |
| 4,115,959 | 9/1978 | McCormick | 51/295 |
| 4,142,869 | 3/1979 | Vereschagin et al. | 51/295 |
| 4,184,853 | 1/1980 | Otopkov et al. | 51/295 |
| 4,203,733 | 5/1980 | Tanaka et al. | 51/295 |
| 4,314,827 | 2/1982 | Leitheiser et al. | 51/298 |
| 4,366,254 | 12/1982 | Rich et al. | 501/89 |
| 4,425,141 | 1/1984 | Buljan et al. | 51/295 |
| 4,505,720 | 3/1985 | Gabor et al. | 51/295 |
| 4,543,343 | 9/1985 | Iyori et al. | 501/87 |
| 4,606,738 | 8/1986 | Hayden | 51/295 |
| 4,734,104 | 3/1988 | Broberg | 51/295 |
| 4,744,802 | 5/1988 | Schwabel | 51/309 |
| 4,746,563 | 5/1988 | Nakano et al. | 428/216 |
| 4,776,863 | 10/1988 | van den Berg et al. | 51/295 |
| 4,788,167 | 11/1988 | Mathers et al. | 501/98 |
| 4,881,951 | 11/1989 | Wood et al. | 51/309 |

FOREIGN PATENT DOCUMENTS 1-113485  5/1989  Japan.

OTHER PUBLICATIONS

Gilmore et al., "Pulsed Metallic-Plasma Generators", *Proceeding of the IEEE*, vol. 60, No. 8, pp. 977-991.

*Primary Examiner*—William R. Dixon, Jr.
*Assistant Examiner*—Willie J. Thompson
*Attorney, Agent, or Firm*—Gary L. Griswold; Walter N. Kirn; Richard Francis

[57] ABSTRACT

Abrasive particles comprising a core of alumina-based mineral coated by cathodic arc deposition with a metal boride, carbide, or nitride refractory material are provided. The core can be fused alumina or an alumina-based ceramic. Improved abrasive products having at least a portion of their conventional abrasive particles replaced with the coated abrasive particles are also provided.

20 Claims, No Drawings

METHOD OF COATING ALUMINA PARTICLES WITH REFRACTORY MATERIAL, ABRASIVE PARTICLES MADE BY THE METHOD AND ABRASIVE PRODUCTS CONTAINING THE SAME

TECHNICAL FIELD

This invention relates to a method of producing abrasive particles by cathodic arc deposition of refractory material on alumina-based core particles, the abrasive particles produced by the method and abrasive articles made with the abrasive particles.

BACKGROUND

Particulate aluminum oxide or alumina has long been employed as abrasive particles or grain in various abrasive products. The first source for alumina abrasive particles was the abundant supply which was found in nature. The naturally occurring alumina was later improved by fusion techniques, heat treatments and the addition of various additives. While such techniques have resulted in a dramatic improvement in the performance of abrasive articles which contain such abrasive particles, there still exists a great need for further improved alumina abrasive material to make it better able to withstand the reactivity and the abrasive wear caused by contact with a metal workpiece.

While at first blush one with a modicum of technical know-how, but not skilled in either the abrasive art or the ceramic cutting tool art, might look to the ceramic cutting tool art for guidance as to how abrasive particles may be improved to give them less reactivity and improved durability. For example, U.S. Pat. No. 4,366,254 describes a cutting tool of alumina, zirconia, and optionally a refractory metal compound such as a metal carbide, nitride, or carbo-nitride of the Group IVB and VB metals and the carbides of the Group VIB metals of the Periodic Table to provide a cutting tool which is tough without being as wear resistant as pure alumina. U.S. Pat. No. 4,543,343 describes a cutting tool comprising a high thermal conductivity ceramic material made of alumina, titanium boride, titanium carbide, and zirconia. U.S. Pat. No. 4,776,863 describes a cutting tool of hard metal which is coated with hard layers of titanium carbide, titanium carbonitride and/or titanium nitride, with an outermost thin layer of zirconium nitride. Successive layers of titanium carbonitride are coated via chemical vapor deposition (CVD) methods as is the zirconium nitride layer which according to the patent can also be deposited via physical vapor deposition (PVD) methods. PVD methods include evaporation by sputtering or by arc evaporation.

A multilayer coated cemented carbide cutting tool is disclosed in U.S. Pat. No. 4,746,563. This patent describes the use of CVD methods to form successive layers of alumina and metal nitrides or carbides on a cemented carbide substrate. The alumina layer with a total thickness ranging from 5 to 20 micrometers is divided into a plurality of layers each having a thickness ranging from 0.01 to 2 micrometers (10 to 2000 nanometers) by use of interlayers each of which has a thickness of 0.01 to 2 micrometers and consists of at least one member selected from the group consisting of TiC, TiN, TiCN, TiCNO, TiCO, TiNO, Ti oxides, Ti(B,N), Ti(B,N,C), SiC, AlN, and AlON.

Sputtering with a coating metal such as molybdenum has been used to coat diamond with an adherent metal layer to promote the bonding between diamond particles when formed into a compact, as described in U.S. Pat. No. 3,351,543. The cited advantage was to be able to bond together small synthetically made diamonds of variable sizes into a usable tool. Sputtering was used to clean the surface of the diamonds and then to coat with molybdenum. Coating thickness are reported as ranging from about 58 nanometers to 200 nanometers.

While certain of the aforementioned references indicate that improved physical properties may be obtained in ceramic cutting tools by the coating of such ceramic tools with refractory metal compounds, such disclosure does not direct the person skilled in the abrasive art to make similar modifications of alumina abrasive particles or grains.

Cutting tools cannot be equated with abrasive grain for several reasons. Grinding was once considered to be a purely mechanical action of metal removal much as a cutting tool. This was supported by the fact that the two commonly used abrasives, alumina and silicon carbide (SiC), behaved differently on different materials. Alumina, believed to be the harder mineral, was effective on high tensile steels while SiC was more effective on low tensile materials. With further study of these materials, it was determined that SiC was actually the harder of the two minerals. With the development of $B_4C$, which was a much harder than either alumina or SiC, it was found that this new mineral was inferior to both alumina and SiC in grinding steels. The theory that grinding was totally a mechanical process fell apart.

The reason why grinding is not totally a mechanical process may be found in comparing the distribution of energy used in metal removal by cutting tools and abrasive grinding. In cutting tools it has been estimated that up to 90% of the total energy used for cutting is removed with the chips and that only about 5% of this total energy goes into the metal surface as heat. As a result, the cutting tool temperature remains relatively low, about 700° to 800° C. for normal cutting speeds. For abrasive grinding, the total energy input into the operation is up to ten times greater than with cutting tools. And of the total energy input, about 80% goes into the workpiece at the grinding interface as heat compared with 5% for cutting tools. The energy going into the workpiece as heat is thus 160 times greater in the case of abrasive grinding than cutting tools. The reason for this difference may be found in the different mechanisms of chip formation and the values of rake angle. In cutting tools the rake angle is near zero allowing almost complete freedom for upward flow and removal of the chip. In abrasive grinding, rake angles have large negative values and there is considerable resistance to upward flow. As a result, considerable energy is spent in deforming the surface in grinding while little energy is removed with the chips. The temperature of the grinding interface thus reaches very high values, and may even reach the melting point of the metal as evidenced by solidified chips often found in the grinding swarf. Another indication of the high temperatures present is the spark shower observed in grinding which consists of chips heated to red or white heat.

As a result of the high temperatures encountered at the grinding interface, the interaction between the metal, the abrasive grain and the atmosphere must be considered. For example, the best explanation of why aluminum oxide is a better abrasive on most steels than silicon carbide is that a chemical reaction occurs at the high temperatures encountered in abrasive grinding between the silicon carbide and the steel which in effect "melts" the abrasive and causes excessive wear. Tungsten carbide, boron carbide and titanium carbide are also examples of very hard materials which have been found to be excellent cutting tool materials, yet have little utility as an abrasive grain due to their reactivities with various metals.

Thus, attempts at improving the grinding performance of abrasive grain for use in abrasive products such as coated abrasives generally have been directed away from substituting the bulk materials used in cutting tools for abrasive grain, and instead have focused on either changing the composition of the grain or on applying thin coats of refractory material to the grain.

U.S. Pat. No. 4,788,167 is an example of the former. In this patent, there is disclosed an abrasive grain comprising aluminum nitride, aluminum oxynitride, and Periodic Group IVB metal nitride. The compositions described offer improvement over known compositions in grinding cold-rolled steel.

An example of the latter for various types of abrasive constructions is disclosed in laid open Patent Publication JP1-113485, published May 2, 1989, which describes alumina, zirconia, or silicon carbide abrasive grain coated with diamond or cubic boron nitride via chemical vapor deposition processes for use in grinding wheels, cutting blades, and finishing work. This publication is directed to conversion of the abrasive grains to "superhard" grains by coating them with diamond or boron nitride in thicknesses ranging from 0.5 to 10 micrometers (500 to 10000 nanometers).

U.S. Pat. No. 4,505,720, assigned to the assignee of the present application, describes an improved granular abrasive mineral made by coating hard refractory material onto silicon carbide abrasive grain. The coatings are applied by chemical vapor deposition onto silicon carbide grit in a fluidized bed. The resultant coated grain offers a significant increase in abrasive performance when used to grind steel.

What has been lacking in the art, however, is an improvement in the grinding characteristics of alumina-based abrasive grain for use in coated abrasives to grind metal.

One reason metal removal by alumina-based coated abrasives is generally at a low rate is probably due to "metal capping" of the abrasive particles. "Metal capping" is the term used to describe the coating of abrasive particles by metal from a workpiece during abrading. Metal capping dramatically reduces the effectiveness of a coated abrasive product. It is a particularly bothersome problem when fine-grade abrasive particles (<100 mesh or 150 micrometers in average particle size) are used. It is believed that elimination or reduction of the metal caps would improve the grinding rate and increase the useful life of the abrasive mineral.

SUMMARY OF THE PRESENT INVENTION

The present invention provides alumina-based abrasive particles coated with an adherent thin (less than 0.1 micrometer) layer of metal boride, carbide or nitride refractory material which, when incorporated into an abrasive product such as a coated abrasive disc, provides notable improved abrasive performance.

While not being bound by theory, this improved abrasive performance is believed to be due to the formation of an interface or barrier layer which prevents the metal workpiece from reacting with the surface of the abrasive particles while at the same time maintaining its abrasive characteristics. This barrier is provided by coating the alumina-based abrasive particles with refractory metal nitride, carbide, and boride via cathodic arc deposition.

Briefly, the abrasive particles of the invention are characterized by each particle comprising an alumina-based core coated with a substantially uniform layer of refractory material at an average coating thickness of less than 100 nanometers. The coatings are preferably a refractory material which is selected from the group of metal borides, carbides, and nitrides. Preferred metal borides, carbides, and nitrides are of a metal selected from the group consisting of scandium, lanthanum, cerium, neodymium, yttrium, titanium, zirconium, hafnium, vanadium, niobium, tantalum, chromium, molybdenum, tungsten and mixtures thereof. Boron carbides and nitrides are also useful.

The preferred coating thickness on the order of 1 to 100 nanometers, preferably 5 to 25 nanometers.

The alumina-based core of the abrasive particles of the present invention is preferably fused alumina, fused alumina:zirconia, or a alumina-based ceramic material such as that obtained by a sol gel process. The preferred ceramics are alpha-alumina based ceramic materials which are made by a sol gel process which may be seeded to provide a finer domain structure or modified to provide a more durable grain with a modifier such as magnesia which on firing the ceramic will produce an alumina:magnesia spinel.

The abrasive particles of the present invention are made by a process which comprises:

a) supplying sufficient current to a metal cathode to form a plasma of the metal comprising the cathode;

b) subjecting the plasma to an atmosphere conducive to the formation of the boride, carbide, or nitride of the metal of the plasma;

c) permitting the plasma to be directed in a path through an anode;

d) maintaining alumina-based particles to be coated within the path;

e) rotating each alumina-based particle to substantially expose the entire surface of each particle to the plasma path;

f) continuing steps a–e until a substantially uniform coating of refractory material is coated on substantially every alumina particle; and g) discontinuing steps a–f before the average coating thickness of the refractory material on the alumina particle reaches 100 nanometers.

The atmosphere may comprise an inert gas such as argon, krypton, xenon, helium, or a member of Group 8 of the Periodic Table and a reactive gas, or a reactive gas alone. Suitable reactive gases include oxygen, nitrogen, ammonia, a hydrocarbon, or a boron-containing gas.

The present invention also provides abrasive articles which comprise abrasive grains which may be substituted partly or in whole by the abrasive particles of the present invention. Such abrasive articles are abrasive products (commonly called sandpaper), bonded abrasive products (e.g., grinding wheels or honing stones), or nonwoven abrasive products. Such products are conventional except the substitution of all or part of the conventional abrasive particles with the abrasive particles of the present invention.

Coated abrasive discs made with the abrasive grains of the present invention show improved grinding performance over the same abrasive discs containing conventional alumina-based abrasive particles without the refractory coating on various metal workpieces such as stainless steel and mild steel. The useful life of the abrasive discs of the present invention is noted to be considerably extended because of the presence of the refractory coating on the abrasive particles. It is thought that the extended life is indicative of a reduction of the metal capping problem. It is expected that the grinding performance of other metal workpieces such titanium, hardened steel, metal alloys would likewise be improved by use of abrasive products which contain abrasive particles according to the present invention.

DETAILED DESCRIPTION

The preferred alumina-based particles which are coated with the refractory materials according to the present invention include fused alumina, fused alumina-zirconia, and sol gel derived ceramic alpha alumina-based abrasive particles with and without seeding materials or modifiers. The alumina-based abrasive particles are preferably made via a sol gel process. Examples of such abrasive grains may be found in the disclosures of U.S. Pat. Nos. 4,314,827; 4,744,802; 4,770,671; and 4,881,951.

To produce abrasive particles according to the invention, a cathodic arc deposition process is used to coat a refractory material over an alumina-based abrasive particle. The alumina-based abrasive particles are placed in a vacuum chamber of a cathodic arc deposition device in or on a device which agitates or vibrates the particles to obtain uniform surface coating in a directional plasma field.

Illustrative examples of methods for agitating the abrasive particles include shaking, vibrating, or rotating the reactor, stirring the particles or suspending them in a fluidized bed. A preferred reaction chamber is comprised of a cylinder fitted with baffles which stir the particles during the coating process. In such reaction chambers, the particles may be agitated by many different ways such that essentially the entire surface of each particle is exposed to the coating flux. Agitation of the particles also tends to prevent agglomeration and to achieve uniform mixing, which results in more uniform coating.

The chamber is evacuated and then backfilled with inert and/or reactive gases to a desired operating pressure. A high current is applied and maintained at the source cathode during the deposition. Reactive deposition of compounds is possible in cathodic arc coating by the simple addition of reactive gas into the coating chamber.

An anode and cathode are provided and placed in such an orientation that when an arc discharge is initiated and when current of sufficient magnitude is supplied to the cathode, an arc discharge occurs between the anode and cathode. The arcs formed are small luminous regions which are very mobile and move rapidly over the cathode surface. Due to the high current density in each spot, rapid ebullition of the cathode material occurs as soon as current is supplied to the cathode. The resulting plasma or beam of particles consists of atoms and ions of source (cathode) material and each particle has a kinetic energy between about 10 and 100 electron volts. A magnetic solenoid directs the beams of atoms and ions onto the substrate surface. The atoms and ions are generally considered to react at the substrate surface with the reactive gases in the chamber to form a thin film.

The coating process typically requires about 5 hours of run time, although from between 1 to 10 hours might also be used. The refractory coated abrasive particles are removed from the vacuum chamber at the end of the run time, and then are used to make abrasive articles.

It is common in vacuum deposition processes to use an inert gas to backfill the vacuum chamber. In the coating process of this invention, however, it is more typical not to use inert gas. The capability of backfilling with inert gases is sometimes desirable because it helps stabilize the discharge from the cathode. If an inert gas is used in the coating process, it may be selected from argon, krypton, xenon, helium and any other gas which is chemically inert in a plasma environment. Argon is generally preferred due to cost and availability.

Reactive gases which can be used to form compounds by this method include oxygen, nitrogen, ammonia, hydrocarbons, and boron-containing gases such as diborane and borazine.

Metals useful in forming the nitride, carbide, or boride coatings in the present invention include, for example, scandium, lanthanum, cerium, neodymium, yttrium, titanium, zirconium, hafnium, vanadium, niobium, tantalum, chromium, molybdenum, tungsten and mixtures thereof. The coating is applied at a thickness of about 1 to 100 nanometers.

High energy plasma from the cathodic arc process tends to encourage the formation of stoichiometric coatings. Because of the high energies involved in the coating process, the coatings are typically very adherent to the substrate.

The coated abrasive particles according to the present invention may be utilized in conventional abrasive products, in some instances it may be preferable that they be used as a blend with less expensive conventional abrasive grits such as fused alumina, silicon carbide, garnet, fused alumina-zirconia and the like. They may also be blended with minerals or materials which are not noted as abrasives such as calcium carbonate, glass, and the like.

Because of the relatively high cost of coating the abrasive particles with refractory materials, it may be preferable to blend the abrasive particles of the present invention with less expensive abrasive minerals. Such blending of abrasive particles is known. A preferred method of blending is described in assignee's U.S. Pat. No. 4,734,104 involving a method known as selective mineral substitution wherein the coarse abrasive mineral is removed from an inexpensive abrasive particle charge that is to be utilized in an abrasive product such as a coated abrasive and is substituted with coarse mineral of the invention. It is recognized in that patent that in any coated abrasive the coarse abrasive grits are substantially responsible for a major portion of the abrading of a workpiece. By such substitution, the improved abrasive particles of the present invention would be interposed in an abrasive product between smaller abrasive particles of conventional abrasive mineral to permit the improved coarse abrasive particles to do the bulk of the abrading with such product. Aforementioned U.S. Pat. No. 4,734,104 is incorporated herein by reference for its disclosure of this feature.

The coated abrasive particles of the present invention are conveniently handled and incorporated into various abrasive products according to well-known techniques to make, for example, coated abrasive products, bonded abrasive products, and lofty non-woven abrasive products. The methods of making such abrasive products are well-known to those skilled in the art. A coated abrasive product includes a backing, for example, formed of fabric (e.g., woven or non-woven fabric such as paper) which may be saturated with a filled binder material, a polymer film such as that formed of oriented heat-set polypropylene or polyethylene terephthalate which may be first primed, if needed, with a priming material, or any other conventional backing material. The coated abrasive also includes a binder material, typically in layers including a make or maker coat, a size or sizing coat and possibly a supersize coat. Conventional binder materials include phenolic resins.

Grinding aids may also be added to the size coat or as particulate material. The preferred grinding aid is $KBF_4$, although other grinding aids are also believed to be useful. Other useful grinding aids include NaCl, sulfur, $K_2TiF_6$, polyvinyl chloride, polyvinylidene chloride, cryolite and combinations and mixtures thereof. The preferred amount of grinding aid is on the order of 50 to 300 g., preferably 80 to 160 g. per square meter of coated abrasive product.

Non-woven abrasive products typically include an open porous lofty polymer filament structure having the refractory coated alumina abrasive grits distributed throughout the structure and adherently bonded therein by an adhesive material. The method of making such non-woven abrasive products is well known.

Bonded abrasive products typically consist of a shaped mass of abrasive grits held together by an organic or ceramic binder material. The shaped mass is preferably in the form of a grinding wheel. The preferred binder materials for the refractory coated alumina abrasive grits of the invention are organic binders. Ceramic or vitrified binders may be used if they are curable at temperatures and under conditions which will not adversely affect the abrasive grits of the present invention.

EXAMPLES

The following examples illustrate the present invention. All parts and percentages are by weight unless otherwise stated.

General Cathode Arc Deposition Method

For cathodic arc deposition, alumina-based abrasive particles are weighed out and placed in a holder in a vacuum system. The holder is positioned to receive the maximum coating flux using a Model 1000 boron nitride confined-type cathodic arc apparatus which is commercially available from Metco Cat Arc division of the Perkin Elmer Corp. This apparatus is similar to that described in U.S. Pat. No. 3,836,451 (Snaper). The apparatus is further equipped with a magnetic solenoid as described in Gilmore et al., "Pulsed Metallic-Plasma Generators," *Proceeding of the IEEE*, V. 60, No. 8, pp. 977–991. The holder is positioned about 7.6 cm from the cathode. The zirconium and titanium cathodes used are commercially available and are obtained from Phoenix Metallurgical Corporation, Houston, Tex., having 7.62 cm diameter and 2.5 cm thickness.

The cathode is mounted on a water-cooled cathode holder, which is installed in a vacuum chamber of the apparatus. After the vacuum chamber is evacuated to $5 \times 10^{-6}$ torr, the high vacuum diffusion pump is throttled, and argon and a reactive gas, or reactive gas alone is admitted to the chamber at a flow rate sufficient to maintain 10–20 millitorr pressure in the chamber. Typically the gas flow rates are adjusted throughout a run in order to maintain a constant pressure. An arc is ignited on the cathode surface and is regulated by a constant current power supply to 150 amps for 400 gram abrasive grain charge runs, and 180 amps for 2000 gram charge runs. A solenoid providing a magnetic field of about 50 Gauss serves to duct the titanium or zirconium plasma to the abrasive grain while agitating the abrasive grain in a cylinder fitted with baffles which stir the grain during the coating process. A typical coating run time is about 5 hours.

Test Methods

In order to test the coated abrasive grain for improved performance, the grain is first conventionally coated on a backing and then converted into 7.6 cm $\times$ 335 cm grinding belts. Grinding tests are carried out on a constant load surface grinder. A preweighed mild steel workpiece approximately $2.5 \times 5 \times 18$ cm, mounted in a holder, is positioned vertically, with its $2.5 \times 18$ cm face confronting an approximately 36 cm diameter 85 Shore A durometer serrated rubber contact wheel with one on one lands over which is entrained the coated abrasive belt. The workpiece is then reciprocated vertically through an 18 cm path at the rate of 20 cycles per minute, while a spring loaded plunger urges the workpiece against the belt under a load of 11.36 Kg as the belt is driven at about 2050 meters per minute.

The test is run by grinding the preweighed workpiece for 1 minute, reweighing the workpiece to obtain the weight of metal removed, and then cooling the workpiece. Successive workpieces were treated the same way until the workpiece set has been completed and then the cycle is repeated until the desired endpoint is obtained. The amount of stock removed is calculated by adding the amount of metal removed from each workpiece for each minute of grinding to obtain a total weight of metal removed.

EXAMPLE 1

A sample of a heat treated fused alumina (HTA), Grade 150 (average particle size of about 95 micrometers), available commercially from Treibacker Chemishe Werke Aklungesellschaft, Treibach, Austria, was coated via cathodic arc deposition as described above with titanium carbide under the following conditions:

Abrasive Grain Charge Weight: 400 grams
Chamber Pressure and atmosphere: 15 millitorr of methane
Cathode Current: 150 amps The grit was exposed to the coating flux for 5 hours, sufficient to yield a coating thickness of approximately 10 nanometers, as calculated. The average coating thickness was calculated from the weight percent of the coating (as determined by standard analytical chemistry methods), the average surface area of the abrasive grain, and the density of the coating material (e.g., titanium nitride has a density of 5.22 g/cc) using the following equation:

$$t = \frac{10 \, W}{SD}$$

where
t = the coating thickness
W = weight percent of coating
D = density in g/cc
S = surface area in m$^2$/gram.

The coated abrasive grain was made into a coated abrasive product using conventional techniques. The coated abrasive product was converted into abrasive belts. Uncoated HTA was used to make a control coated abrasive which was also converted to an abrasive belt.

In each case the backing material was a Y weight sateen polyester and the belt size was 7.6 cm × 335.3 cm. The backing was coated with a traditional $CaCO_3$ filled phenol formaldehyde resole resin make coat which, upon curing, contained 45.2% $CaCO_3$ and 54.8% resin. Then abrasive mineral was applied by electrostatic deposition. The make coat was precured for 2 hours at 80° C. and then a size coat was applied. The size coat was a traditional $CaCO_3$ filled phenolic resole resin which, upon curing, contained 59.6% $CaCO_3$ and 40.4% resin. After application of the size coat coated abrasive was cured for 12 hours at 100° C.

The belts were tested on the surface grinder described above by grinding 4 workpieces of 4150 mild steel for a total of 20 minutes at 11.36 Kg pressure. The control was prepared and tested in an identical manner, and results are as follows:
Total Amount of Metal Removed by Control Belt: 352.3 grams
Total Amount of Metal Removed by Example 1 Belt: 382.96 grams
Percent Improvement: 8.7%

EXAMPLE 2

A sample of the heat treated fused alumina (HTA), described in Example 1 was coated via cathodic arc deposition with titanium nitride under the following conditions:
Abrasive Grain Charge Weight: 400 grams
Chamber Pressure and Atmosphere: 15 millitorr of nitrogen
Cathode Current: 150 amps The abrasive grain was exposed to the coating flux for 5 hours, sufficient to yield a coating thickness of approximately 10 nanometers. The resulting coated abrasive grain was used to make coated abrasives which were converted into belts and tested as described in Example 1, with results as follows:
Total Amount of Metal Removed by Control Belt: 352.3 grams
Total Amount of Metal Removed by Example 2 Belt: 390.6 grams
Percent Improvement: 10.8%

EXAMPLE 3

A sample of a ceramic sol gel alumina-based abrasive grain, Grade 150, made according to Example 18 (except including 0.5% magnesia) of co-pending application U.S. Ser. No. 282,593, filed 12/12/88, was coated via cathodic arc deposition with titanium nitride under the following conditions:
Abrasive Grain Charge Weight: 400 grams
Chamber Pressure and Atmosphere: 15 millitorr of nitrogen
Cathode Current: 150 amps The abrasive was exposed to the coating flux for 5 hours, sufficient to yield a calculated coating thickness of approximately 10 nanometers. The resulting coated abrasive grain was used to make coated abrasive product which was converted into abrasive belts and tested as described in Example 1, with results as follows:
Total Amount of Metal Removed by Control Belt: 248.3 grams
Total Amount of Metal Removed by Example 3 Belt: 268.26 grams
Percent Improvement: 8.2%

EXAMPLE 4

Alpha alumina, magnesia-modified, iron oxide-seeded, ceramic abrasive grain obtained under the trade designation "Cubitron" from Minnesota Mining and Manufacturing Company, Grade 150, was coated with zirconium carbide via cathodic arc deposition under the following conditions:
Abrasive Grain Charge Weight: 2000 grams
Chamber Pressure and Atmosphere: 15 millitorr of methane
Cathode Current: 180 amps The abrasive grain was exposed to the coating flux for 5 hours, sufficient to yield a calculated coating thickness of approximately 10 nanometers.

The resulting coated abrasive grain was used to make coated abrasive using conventional techniques and the coated abrasive was converted into abrasive belts. Uncoated Cubitron grain was used to make coated abrasive which was converted to a control belt.

The coated abrasive backing material was a treated cotton J weight drill cloth, obtained from Gustav Ernstmeier Gmbh and Co. KG, West Germany, and the belt size was 7.6 cm × 335.3 cm.

The cloth was coated with a traditional $CaCO_3$ filled phenolic resole resin which, upon curing, resulted in a solids content of 42% $CaCO_3$ and 58% resin. Then abrasive mineral was applied by electrostatic deposition to a density of 0.0151 gram/cm$^2$.

The make coat was precured according to the following heating schedule:
4 minutes@71° C.
20 minutes@96° C.
74 minutes@104° C.

The size coat was a traditional $CaCO_3$ filled phenolic resole resin which, upon curing, had a solids content of 80% $CaCO_3$ and 20% resin. After coating, the belt was cured according the following heating schedule:
20 minutes@57° C.
40 minutes@71° C.
20 minutes@81° C.
80 minutes@89° C.
90 minutes@58° C.

Then for a final cure the belt was rolled into a drum and cured for 12 hours at 99° C. The belts were tested on the surface grinder described above by grinding 4 workpieces of 4150 mild steel for a total of 20 minutes at 4.5 Kg pressure with the following results:
Total Metal Removed by Control Belt: 346.46 grams
Total Metal Removed by Example 4 Belt: 427.86 grams
Percent Improvement: 23.5%

EXAMPLE 5

The Cubitron abrasive grain described in Example 4, Grade 150, was coated with zirconium carbide via cathodic arc deposition under the following conditions:
Abrasive Grain Charge Weight: 2000 grams
Chamber Pressure and Atmosphere: 15 millitorr of methane
Cathode Current: 180 amps The grit was exposed to the coating flux for 5 hours, sufficient to yield a calculated coating thickness of approximately 10 nanometers. The coated abrasive grain was used to make coated abrasive product which was converted into abrasive belts and tested as described in Example 4, with results as follows:
Total Metal Removed by Control Belt: 304.9 grams
Total Metal Removed by Example 5 Belt: 395.1 grams
Percent Improvement: 29.6%

While this invention has been described in terms of specific embodiments, it should be understood that it is capable of further modifications. The claims are intended to cover those variations which one skilled in the art would recognize as the chemical equivalent of what has been described here.

We claim:

1. Abrasive particles, each particle of which comprises an alumina-based core coated with a substantially uniform refractory material at an average coating thickness of less than 100 nm.

2. The abrasive particles of claim 1 wherein said refractory material is selected from a group consisting of metal borides, carbides and nitrides.

3. The abrasive particles of claim 1 wherein said refractory material is a boride, carbide or nitride of a metal selected from the group consisting of scandium, lanthanum, cerium, neodymium, yttrium, titanium, zirconium, hafnium, vanadium, niobium, tantalum, chromium, molybdenum, tungsten and mixtures thereof.

4. The abrasive particles of claim 1 wherein said coating thickness is greater than about 1 nm.

5. The abrasive particles of claim 1 wherein said coating thickness is about 5 to 25 nm.

6. The abrasive particles of claim 1 wherein said core is fused alumina.

7. The abrasive particles of claim 1 wherein said core is an alumina-based ceramic.

8. The abrasive particles of claim 7 wherein said alumina-based ceramic is a sol gel alpha-alumina-based ceramic.

9. The abrasive particles of claim 8 wherein said sol gel-alpha-alumina-based ceramic is modified with a metal oxide other than alpha alumina or the reaction product of said metal oxide and alumina.

10. An abrasive article comprising abrasive particles wherein at least a portion of said abrasive particles are the abrasive particles of claim 1.

11. The abrasive article of claim 10 in the form of a coated abrasive product.

12. The abrasive article of claim 10 in the form of a bonded abrasive product.

13. The abrasive article of claim 10 in the form of a nonwoven abrasive product.

14. A process for making abrasive particles, each particle of which has an alumina-based core coated with a substantially uniform layer of metal boride, carbide or nitride refractory material, said process comprising
a) applying sufficient current to a metal cathode to form a plasma of the metal comprising the cathode;
b) subjecting said plasma to an atmosphere conducive to the formation of the boride, carbide or nitride of the metal of said plasma;
c) permitting said plasma to be directed in a path through an anode;
d) maintaining alumina-based particles to be coated within said path;
e) rotating each alumina-based particle to substantially expose the entire surface of each of said particles to said plasma path;
f) continuing steps a-e until a substantially uniform coating of refractory material is coated on substantially every alumina-based particle, and
g) discontinuing steps a-f before the average coating thickness of refractory material on the alumina-based particles exceeds 100 nm.

15. The process of claim 14 wherein said atmosphere comprises an inert gas.

16. The process of claim 14 wherein said inert gas is selected from argon, krypton, xenon, helium, or a member of Group 8 of the Periodic Table.

17. The process of claim 14 wherein said atmosphere comprises a reactive gas.

18. The process of claim 17 wherein said reactive gas comprises oxygen, nitrogen, ammonia, a hydrocarbon or a boron-containing gas.

19. Abrasive particles, each particle of which comprises an alumina-based core coated with a substantially uniform layer of refractory material selected from the group consisting of metal borides, carbides, and nitrides.

20. The abrasive particles of claim 19 wherein said refractory material is selected from a group consisting of boron carbide and boron nitride.

* * * * *

UNITED STATES PATENT AND TRADEMARK OFFICE
CERTIFICATE OF CORRECTION

PATENT NO. : 5,085,671

DATED : February 4, 1992

INVENTOR(S) : MARTIN, ET AL.

It is certified that error appears in the above-identified patent and that said Letters Patent is hereby corrected as shown below:

On the title page of the printed patent under the section "U.S. Patent Documents", the patent number for the second listed reference should read --4,770,671--.

Column 11, line 17, "uniform refractory" should read --uniform layer of refractory--.

Signed and Sealed this

Eighth Day of February, 1994

Attest:

BRUCE LEHMAN

Attesting Officer  Commissioner of Patents and Trademarks